(12) United States Patent
Amano

(10) Patent No.: US 11,940,045 B2
(45) Date of Patent: Mar. 26, 2024

(54) POWER TRANSMISSION APPARATUS FOR VEHICLE

(71) Applicant: TOYOTA JIDOSHA KABUSHIKI KAISHA, Toyota (JP)

(72) Inventor: Jun Amano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/336,507

(22) Filed: Jun. 16, 2023

(65) Prior Publication Data

US 2023/0407961 A1 Dec. 21, 2023

(30) Foreign Application Priority Data

Jun. 18, 2022 (JP) .................................. 2022-098499

(51) Int. Cl.
*F16H 61/12* (2010.01)

(52) U.S. Cl.
CPC ..... *F16H 61/12* (2013.01); *F16H 2061/1224* (2013.01); *F16H 2061/1252* (2013.01); *F16H 2061/1264* (2013.01)

(58) Field of Classification Search
CPC ............. F16H 61/12; F16H 2061/1224; F16H 2061/1252; F16H 2061/1264
See application file for complete search history.

(56) References Cited

U.S. PATENT DOCUMENTS

| | | | |
|---|---|---|---|
| 2004/0002404 A1* | 1/2004 | Yi ....................... | F16H 61/0021 475/276 |
| 2015/0330504 A1* | 11/2015 | Yamashita ............ | F16H 61/688 192/3.58 |
| 2016/0230883 A1* | 8/2016 | Tsuchida ................. | F16H 61/12 |
| 2017/0016530 A1* | 1/2017 | Moriyama .......... | F16H 61/0267 |
| 2018/0202541 A1* | 7/2018 | Tsuchida ............. | F16H 61/0403 |

FOREIGN PATENT DOCUMENTS

JP 2019124255 A 7/2019

* cited by examiner

*Primary Examiner* — Edwin A Young
(74) *Attorney, Agent, or Firm* — Hunton Andrews Kurth LLP

(57) ABSTRACT

In a power transmission apparatus for a vehicle, in event of detection of an anomaly with a possibility of an ON failure of a lockup hydraulic control valve, a fail safe mode is established by placing a first switching valve and a third switching valve in respective predetermined connection states, and placing a failure switching valve in a predetermined connection state based on an output of the lockup hydraulic control valve, whereby a lockup clutch is held in its released state, and a forward-driving engagement device is engaged by a control pressure of a second hydraulic control valve, for thereby enabling a forward driving of the vehicle. Upon selection of a neutral range in the event of the detection of the anomaly, an output of the lockup hydraulic control valve and an output of the second hydraulic control valve are stopped.

2 Claims, 7 Drawing Sheets

FIG.3

| | SOLENOID VALVES | | | | | | ENGAGING DEVICES | | | | |
|---|---|---|---|---|---|---|---|---|---|---|---|
| | SC1 | SC2 | SC3 | SL1 | SL2 | SLU | C1 | C2 | B1 | S1 | LU |
| P·N | ○ | ○ | × | × | × | × | × | × | × | ○ | × |
| R | ○ | × | ○ | ○ | × | ○ | × | × | ○ | ○ | × |
| D — GEAR DRIVING | × | ○ | × | ○ | × | ◎ | ○ | × | × | ○ | △ |
| D — LOW-SPEED BELT DRIVING | × | ○ | × | × | ○ | ◎ | × | ○ | × | ○ | △ |
| D — HIGH-SPEED BELT DRIVING | × | × | × | × | ○ | ◎ | × | ○ | × | × | △ |
| D — FAIL SAFE | ○ | ○ | × | × | ○ | ○ | × | ○ | × | ○ | × |

○ : ON (ENERGIZED)  
× : OFF (DE-ENERGIZED)  
◎ : ON FOR ENGAGING LU CLUTCH

○ : ENGAGED  
× : RELEASED  
△ : ENGAGED UNDER CONDITION

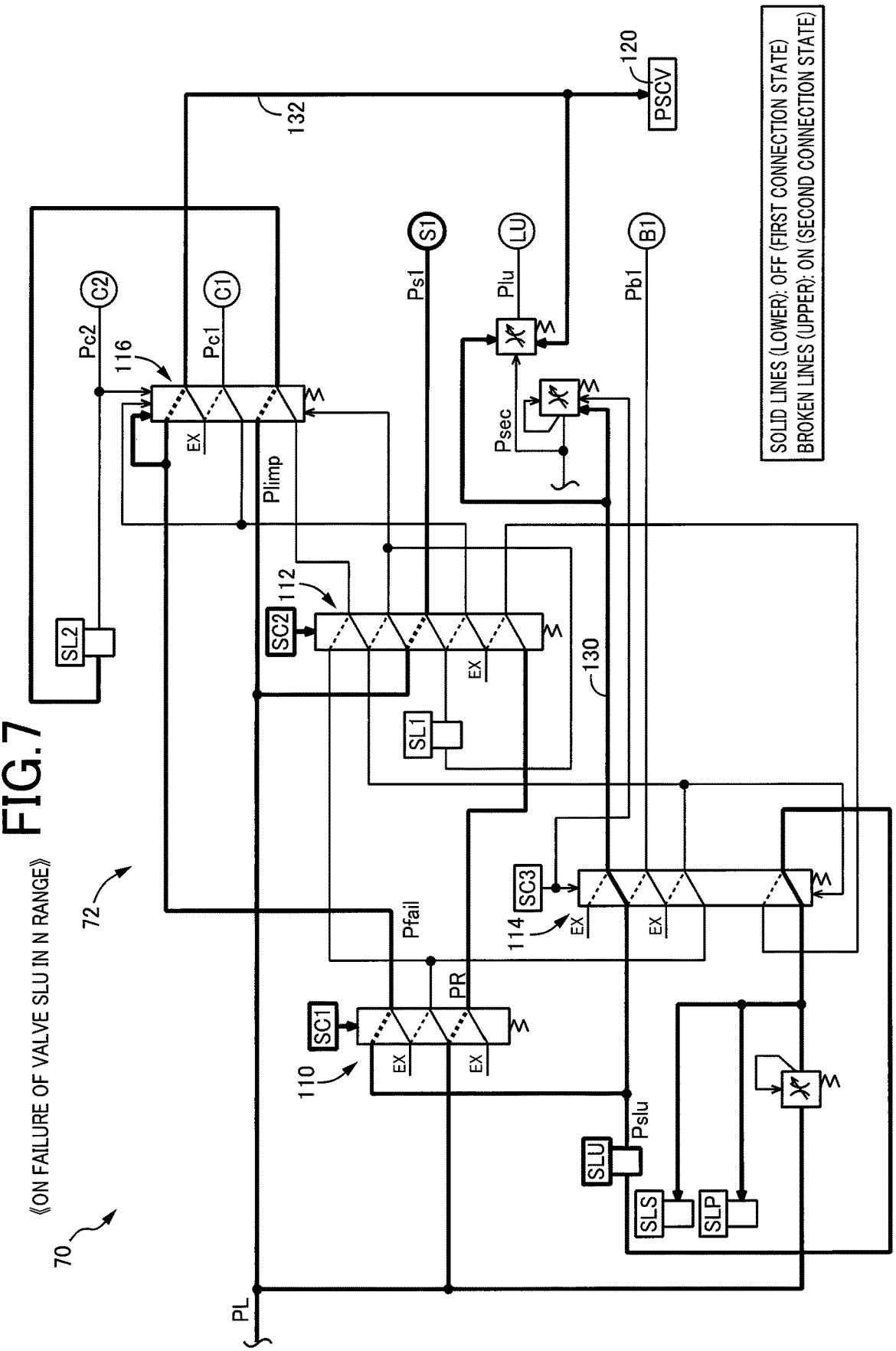

POWER TRANSMISSION APPARATUS FOR VEHICLE

This application claims priority from Japanese Patent Application No. 2022-098499 filed on Jun. 18, 2022, the disclosure of which is herein incorporated by reference in its entirety.

FIELD OF THE INVENTION

The present invention relates to a power transmission apparatus for a vehicle, and more particularly to an improvement of such a power transmission apparatus that is configured to establish a fail safe mode enabling forward driving of the vehicle in event of detection of an anomaly of a hydraulic control valve.

BACKGROUND OF THE INVENTION

There is known a power transmission apparatus for a vehicle, which includes (a) a fluid transmission device having a lockup clutch and (b) an automatic transmission including: an input shaft to which a power is to be transmitted from a drive power source through the fluid transmission device; an output shaft; a hydraulically-operated forward-driving engagement device for forward driving of the vehicle; and a hydraulically-operated reverse-driving engagement device for reverse driving of the vehicle. An example of such a power transmission apparatus is disclosed in JP 2019-124255A, wherein the disclosed power transmission apparatus includes a torque converter 16 as the fluid transmission device and a vehicle transmission 78 as the automatic transmission. The automatic transmission defines a first power transmission path and a second power transmission path that are disposed in parallel to each other between the input shaft and the output shaft, wherein the first power transmission path is provided by a gear power transmission device, a hydraulically-operated gear-forward-driving frictional engagement device, a hydraulically-operated gear-reverse-driving frictional engagement device and a hydraulically-operated synchronous-meshing engagement device that is disposed in series with the gear-forward-driving frictional engagement device and the gear-reverse-driving frictional engagement device, for the forward driving and the reverse driving of the vehicle, and wherein the second power transmission path is provided by a belt continuously-variable transmission and a hydraulically-operated belt-driving frictional engagement device, for the forward driving of the vehicle.

SUMMARY OF THE INVENTION

By the way, the vehicle power transmission apparatus needs various hydraulic control valves for controlling hydraulic pressures of hydraulically-operated engagement devices and also switching valves for switching fluid paths. From a viewpoint of reducing number of parts or components, it is being considered to control a plurality of kinds of hydraulic pressures by using a common hydraulic control valve. However, where a hydraulic control valve is used for controlling the plurality of kinds of hydraulic pressures, in event of a single failure in which the single hydraulic control valve is fixed or stuck in its hydraulic output state, the engagement device could be engaged even in a neutral range thereby causing discomfort to a driver of the vehicle.

For example, FIG. 2 shows, by way of example, a hydraulic control unit of the vehicle power transmission apparatus including a forward-driving clutch C1 as the above-described gear-forward-driving frictional engagement device, a reverse-driving brake B1 as the gear-reverse-driving frictional engagement device, a belt-driving clutch C2 as the above-described belt-driving frictional engagement device and a lockup clutch LU. This hydraulic control unit 70 includes a first switching valve 110, a second switching valve 112, a third switching valve 114 and a failure switching valve 116 that are provided for switching fluid paths, and a lockup hydraulic control valve SLU, a first hydraulic control valve SL1 and a second hydraulic control valve SL2 that are provided for controlling hydraulic pressures.

The first switching valve 110 can be switched between its first connection state indicated by solid lines and its second connection state indicated by broken lines, and the connection states are electrically switched by an ON-OFF solenoid valve SC1. The second switching valve 112 can be switched between its first connection state indicated by solid lines and its second connection state indicated by broken lines, and the connection states are electrically switched by an ON-OFF solenoid valve SC2. A control pressure Psl1 of the first hydraulic control valve SL1 supplied from the second switching valve 112 or a line pressure PL supplied from the second switching valve 112 is supplied to the synchronous-meshing clutch S1 as an S1 engagement pressure Ps1, and the synchronous-meshing clutch S1 is brought into synchronous-meshing engagement based on the S1 engagement pressure Ps1. The third switching valve 114 can be switched between its first connection state indicated by solid lines and its second connection state indicated by broken lines, and the connection states are electrically switched by the ON-OFF solenoid valve SC3. In the first connection state of the third switching valve 114, a control pressure Pslu regulated by the lockup hydraulic control valve SLU using the line pressure PL as a source pressure is used as a controlling pressure for the lockup engagement pressure Plu. On the other hand, in the second connection state of the third switching valve 114, the control pressure Pslu, which is regulated by the lockup hydraulic control valve SLU using a R-range pressure PR as a source pressure, is supplied to the reverse-driving brake B1 as a B1 engagement pressure Pb1. Thus, the lockup hydraulic control valve SLU is used as a common hydraulic control valve for controlling hydraulic pressures of the lockup clutch LU and the reverse-driving brake B1.

The failure switching valve 116 is switchable between its first connection state indicated by solid lines and its second connection state indicated by broken lines. In the first connection state of the failure switching valve 116, the control pressure Psl1 regulated by the first hydraulic control valve SL1 using a D-range pressure PD as a source pressure is supplied to the forward-driving clutch C1 as a C1 engagement pressure Pc1. Thus, the first hydraulic control valve SL1 is used as a common hydraulic control valve for controlling hydraulic pressures of the forward-driving clutch C1 and the synchronous-meshing clutch S1. This failure switching valve 116 is mechanically placed in its second connection state when a failure pressure Pfail is supplied to the failure switching valve 116, and is mechanically placed in its first connection state when the failure pressure Pfail is stopped to be supplied to the failure switching valve 116. The second hydraulic control valve SL2 controls a source pressure that is the D-range pressure PD or an evacuation pressure Plimp supplied from the failure switching valve 116, and a control pressure Psl2 regulated by the second hydraulic control valve SL2 is supplied to the belt-driving clutch C2 as a C2 engagement pressure Pc2, so that an operation state of the belt-driving clutch C2 is controlled in accordance with the control pressure Psl2, for forward driving of the vehicle using the belt continuously-variable transmission.

On the other hand, the vehicle power transmission apparatus provided with the hydraulic control unit 70 is required to be placed in a fail safe mode for enabling the forward driving, in event of detection of a predetermined anomaly with a possibility of a failure (hereinafter referred to as "ON failure") in which the lockup hydraulic control valve SLU is fixed or stuck in its hydraulic output state. Since the lockup hydraulic control valve SLU is used as the common hydraulic control valve for controlling both of an engagement pressure Plu of the lockup clutch LU and an engagement pressure Pb1 of the reverse-driving brake B1, if the lockup hydraulic control valve SLU is stuck in the hydraulic output state, the lockup clutch LU is always placed in its engaged state, except during the reverse driving, whereby the drive power source is directly connected to wheels of the vehicle, so that rotation of the drive power source is stopped upon stop of the vehicle, thereby causing a risk of an engine stall or the like.

The fail safe mode is to be established for enabling the forward driving while avoiding the power source from being directly connected to the wheels of the vehicle. The fail safe mode is established, for example, by placing the first switching valve 110 in its second connection state, placing the second switching valve 112 in its second connection state, placing the third switching valve 114 in its first connection state, and placing the failure switching valve 116 in its second connection state based on the failure pressure Pfail that is an output of the lockup hydraulic control valve SLU. FIG. 4 is a hydraulic circuit diagram in which hydraulic transmission paths in the fail safe mode are indicated by thick lines. With the failure switching valve 116 being placed in the second connection state, the failure pressure Pfail is supplied to a lockup release passage 132 whereby the lockup clutch LU is placed in the released state, and the belt-driving clutch C2 is engaged by a control pressure of the second hydraulic control valve SL2 so as to enable the forward driving using the belt continuously-variable transmission. That is, the belt-driving clutch C2 corresponds to the forward-driving engagement device that is to be engaged in the fail safe mode, for enabling the forward driving.

In the fail safe mode that is established in event of detection of the above-described anomaly, when a neutral range (N range) is selected for cutting off power transmission, if the ON-OFF solenoid valve SC1 is placed in its de-energized state (OFF) whereby the first switching valve 110 is placed in the first connection state, the failure pressure Pfail is stopped to be outputted so that supply of the hydraulic pressure to the lockup release passage 132 is stopped. Therefore, in event of the ON failure in which the lockup hydraulic control valve SLU is actually stuck in the hydraulic output state, the lockup clutch LU is engaged based on the output pressure of the lockup hydraulic control valve SLU in the neutral range. In this state, when a reverse range (R range) is selected for the reverse driving, the third switching valve 114 is placed in the second connection state whereby the reverse-driving brake B1 is engaged and the lockup clutch LU is released. However, if the reverse-driving brake B1 is suddenly engaged due to the ON failure of the lockup hydraulic control valve SLU, the engine stall could be caused by a pressure remaining in the lockup clutch LU. Further, when the fail safe mode is established by switching the neutral range to a drive range (D range) for the forward driving, the failure pressure Pfail is supplied to the lockup release passage 132 whereby the lockup clutch LU. In this instance, however, if the belt-driving clutch C2 is engaged too quickly, the engine stall could be caused by the pressure remaining in the lockup clutch LU.

On the other hand, in the fail safe mode shown in FIG. 4, if the belt-driving clutch C2 is released by stopping the output of the second hydraulic control valve SL2, the neutral range can be established with the lockup clutch LU being held in the released state, so that it is possible to prevent the engine stall. However, if the second hydraulic control valve SL2 suffers from the ON failure in which the second hydraulic control valve SL2 is stuck in the hydraulic output state, the belt-driving clutch C2 is engaged in spite of the neutral range, thereby causing a risk of discomfort to the vehicle driver. Particularly, even when the lockup hydraulic control valve SLU works normally, the fail safe mode could be established, for example, when the engine is stopped due to lack of fuel. In such a case, the belt-driving clutch C2 is engaged in spite of the neutral range, due to the single failure of the second hydraulic control valve SL2, so that a robustness is reduced.

The present invention was made in view of the background art described above. It is therefore an object of the present invention to prevent a frictional engagement device from being engaged due to a single failure of a hydraulic control valve when a neutral range is selected with a lockup clutch being held in its released state in event of anomaly detection by which a fail safe mode is established.

The object indicated above is achieved according to the following aspects of the present invention.

According to a first aspect of the invention, there is provided a power transmission apparatus for a vehicle, comprising: (a) a fluid transmission device having a lockup clutch; (b) an automatic transmission including: an input shaft to which a power is to be transmitted from a drive power source through the fluid transmission device; an output shaft; a hydraulically-operated forward-driving engagement device for forward driving of the vehicle; and a hydraulically-operated reverse-driving engagement device for reverse driving of the vehicle; and (c) a hydraulic control unit including a first switching valve, a third switching valve and a failure switching valve that are provided for switching fluid paths, and a lockup hydraulic control valve and a second hydraulic control valve that are provided for controlling various hydraulic pressures. The first switching valve is configured, when being placed in a first connection state thereof, to output a line pressure that is a source pressure for the various hydraulic pressures, as a D-range pressure for the forward driving of the vehicle, and is configured, when being placed in a second connection state thereof, to output a control pressure of the lockup hydraulic control valve, as a failure pressure to the failure switching valve. The third switching valve is configured, when being placed in a first connection state thereof, to output the control pressure of the lockup hydraulic control valve to a lockup engagement passage for controlling an engagement pressure of the lockup clutch, and is configured, when being placed in a second connection state thereof, to output the control pressure of the lockup hydraulic control valve to the reverse-driving engagement device. The failure switching valve is configured, when being placed in a first connection state thereof, to output the D-range pressure that is supplied with the first switching valve being placed in the first connection state thereof, to the second hydraulic control valve, and is configured, when being placed in a second connection state thereof, to output the line pressure that is supplied through a path separate from the D-range pressure, as an evacuation pressure for evacuation driving of the vehicle, to the second hydraulic control valve, and to output the failure pressure that is supplied with the first switching valve being placed in the second connection state thereof, to a lockup release passage for forcibly releasing the lockup clutch. The failure switching valve is mechanically placed in the second connection state thereof when the failure pressure is supplied to the failure switching valve, and is mechanically placed in the first connection state thereof when the failure pressure is stopped to be supplied to the failure switching valve. The second hydraulic control valve is disposed between the failure switching valve and the forward-driving engagement device, and is configured to control one of the D-range pressure and the evacuation pressure that are supplied from the failure switching valve, and to output a hydraulic output that is a controlled one of the D-range pressure and the evacuation pressure to the forward-driving engagement device for thereby controlling an operation state of the forward-driving engagement device. The power transmission apparatus comprises a control apparatus configured, in event of detection of a predetermined anomaly with a possibility of a failure in which the lockup hydraulic control valve is stuck in a hydraulic output state thereof, to establish a fail safe mode in which the first switching valve is placed in the second connection state thereof, the third switching valve are placed in the first connection state thereof, and the failure switching valve is placed in the second connection state based on the failure pressure that is a hydraulic output of the lockup hydraulic control valve, whereby the lockup clutch is held in a released state thereof based on the failure pressure supplied to the lockup release passage from the failure switching valve, and the forward-driving engagement device is engaged by a control pressure of the second hydraulic control valve, for thereby enabling the forward driving. The control apparatus is configured, upon selection of a neutral range for cutting off transmission of the power in the event of the detection of the predetermined anomaly, to place the first switching valve in the second connection state thereof, place the third switching valve in the first connection state thereof, and stop the hydraulic output of the lockup hydraulic control valve and the hydraulic output of the second hydraulic control valve.

According to a second aspect of the invention, in the power transmission apparatus according to the first aspect of the invention, the automatic transmission defines a first power transmission path and a second power transmission path that are disposed in parallel to each other between the input shaft and the output shaft. The first power transmission path is provided by a gear power transmission device, a hydraulically-operated gear-forward-driving frictional engagement device, a hydraulically-operated gear-reverse-driving frictional engagement device and a hydraulically-operated synchronous-meshing engagement device that is disposed in series with the gear-forward-driving frictional engagement device and the gear-reverse-driving frictional engagement device, for enabling the forward driving and the reverse driving. The second power transmission path is provided by a belt continuously-variable transmission and a hydraulically-operated belt-driving frictional engagement device, for enabling the forward driving of the vehicle. The belt-driving frictional engagement device is the forward-driving engagement device while the gear-reverse-driving frictional engagement device is the reverse-driving engagement device. The hydraulic control unit includes, in addition to the first switching valve, the third switching valve, the failure switching valve, the lockup hydraulic control valve and the second hydraulic control valve, a second switching valve that is provided for switching the fluid paths and a first hydraulic control valve that is provided for controlling the hydraulic pressures. The first switching valve is configured, when being placed in the second connection state, to output the line pressure as an R-range pressure for the reverse driving of the vehicle, to the second switching valve. The third switching valve is configured, when being placed in the first connection state, to output the D-range pressure that is supplied with the first switching valve being placed in the first connection state thereof, to the second switching valve, and to output the line pressure to the lockup hydraulic control valve, and is configured, when being placed in the second connection state, to output the R-range pressure that is supplied through the second switching valve with the first switching valve being placed in the second connection state thereof, to the lockup hydraulic control valve. The second switching valve is configured, when being placed in the first connection state, to output the D-range pressure that is supplied with the first switching valve being placed in the first connection state thereof and with the third switching valve being placed in the first connection state thereof, to the failure switching valve, to output the line pressure to the first hydraulic control valve, to output a control pressure of the first hydraulic control valve to the synchronous-meshing engagement device, and to output the R-range pressure that is supplied with the first switching valve being placed in the second connection state thereof, to the third switching valve, and is configured, when being placed in the second connection state, to output the D-range pressure that is supplied with the first switching valve being placed in the first connection state thereof, to the failure switching valve, to output the D-range pressure that is supplied with the first switching valve being placed in the first connection state thereof and with the third switching valve being placed in the first connection state thereof, to the first hydraulic control valve, to output the control pressure of the first hydraulic control valve, to the failure switching valve, and to output the line pressure to the synchronous-meshing engagement device. The failure switching valve is configured, when being placed in the first connection state, to output the D-range pressure that is supplied with the first switching valve being placed in the first connection state thereof and with the second switching valve being placed in the second connection state thereof, and supplied with the first switching valve being placed in the first connection state thereof, with the third switching valve being placed in the first connection state thereof and with the second switching valve being placed in the first connection state, to the second hydraulic control valve, and to output the control pressure of the first hydraulic control valve that is supplied with the first switching valve being placed in the first connection state thereof, with the third switching valve being placed in the first connection state thereof and with the second switching valve being placed in the second connection state, to the gear-forward-driving frictional engagement device. The control apparatus is configured, upon selection of a reverse range for the reverse driving of the vehicle in the event of the detection of the predetermined anomaly, to place the first switching valve in the second connection state thereof, place the second switching valve in the first connection state, place the third switching valve in the second connection state thereof, and to place the lockup hydraulic control valve and the first hydraulic control valve in hydraulic output states thereof.

In the power transmission apparatus according to the first or second aspect of the invention, in event of detection of the predetermined anomaly with a possibility of the failure in which the lockup hydraulic control valve is stuck in the hydraulic output state, the first switching valve is placed in the second connection state thereof, the third switching valve is placed in the first connection state, and the failure switching valve is placed in the second connection state based on the failure pressure that is the hydraulic output of the lockup hydraulic control valve whereby the same failure pressure is supplied to the lockup release passage through the failure switching valve placed in the second connection state so that the lockup clutch is held in the released state, and the evacuation pressure is supplied to the second hydraulic control valve through the failure switching valve through the failure switching valve placed in the second connection state. Therefore, the forward-driving engagement device is engaged by the control pressure of the second hydraulic control valve, thereby establishing a fail safe mode that enables a forward driving of the vehicle. Thus, not only in a case in which the lockup hydraulic control valve actually works normally but also in a case in which the lockup hydraulic control valve actually suffers from the failure in which the lockup hydraulic control valve is stuck in the hydraulic output state, it is possible to perform the forward driving, and to appropriately perform the evacuation driving without an engine stall or the like when the vehicle is stopped, with the lockup clutch being held in the released state.

When the neutral range is selected in the event of the detection of the predetermined anomaly by which the fail safe mode is established, the first switching valve is placed in the second connection state, the third switching valve is placed in the first connection state, and the hydraulic output of the lockup hydraulic control valve and the hydraulic output of the second hydraulic control valve are stopped. In this instance, if lockup hydraulic control valve works normally, the output of the lockup hydraulic control valve is stopped and accordingly the supply of the failure pressure to the failure switching valve is stopped whereby the failure switching valve is placed in the first connection state. Thus, the lockup clutch is held in the released state, so that it is possible to prevent occurrence of the engine stall or the like as a result of stop of rotation of the drive power source due to engagement of the lockup clutch when the neutral range is switched to the reverse range or the drive range. Further, with the first switching valve being placed in the second connection state and with the failure switching valve being placed in the first connection state, the supply of the hydraulic pressure from the failure switching valve to the second hydraulic control valve is stopped, and accordingly the forward-driving engagement device is never engaged even if the second hydraulic control valve suffers from a failure in which the second hydraulic control valve is stuck in the hydraulic output state, so that it is possible to prevent the forward-driving engagement device from being engaged even in the neutral range due to the single failure of the second hydraulic control valve, and to prevent discomfort from being given to a driver of the vehicle.

On the other hand, in a case in which the lockup hydraulic control valve actually suffers from the failure in which the lockup hydraulic control valve is stuck in the hydraulic output state, the failure switching valve is placed in the second connection state based on the failure pressure by the output of the lockup hydraulic control valve, thereby establishing a state substantially the same as the fail safe mode even in the neutral range. That is, the failure pressure is supplied from the failure switching valve to the lockup release passage whereby the lockup clutch is held in the released state, so that it is possible to prevent occurrence of the engine stall or the like as a result of stop of rotation of the drive power source due to engagement of the lockup clutch when the neutral range is switched to the reverse range or the drive range. Further, with the output of the second hydraulic control valve being stopped, the forward-driving engagement device is released thereby establishing the neutral state in which the power transmission is cut off.

In the power transmission apparatus according to the second aspect of the invention, the automatic transmission defines the first power transmission path and the second power transmission path, wherein the first power transmission path is provided by the gear power transmission device, the gear-forward-driving frictional engagement device, the gear-reverse-driving frictional engagement device and the synchronous-meshing engagement, and the second power transmission path is provided by the belt continuously-variable transmission and the belt-driving frictional engagement device, and wherein the hydraulic control unit includes the second switching valve and the first hydraulic control valve. When the reverse range is selected in the event of the detection of the predetermined anomaly by which the fail safe mode is established, the first switching valve is placed in the second connection state, the second switching valve is placed in the first connection state, the third switching valve is placed in the second connection state, the lockup hydraulic control valve is placed in the hydraulic output state, and the first hydraulic control valve is placed in the hydraulic output state. Thus, the gear-reverse-driving frictional engagement device is engaged based on the control pressure of the lockup hydraulic control valve that is supplied from the third switching valve, and the synchronous-meshing engagement device is engaged based on the control pressure of the first hydraulic control valve that is supplied from the second switching valve, thereby enabling the reverse driving using the gear power transmission device. In that case, in the neutral range, the lockup clutch is held in the released state, irrespective of whether the lockup hydraulic control valve actually suffers from the failure in which the lockup hydraulic control valve is stuck in the in the hydraulic output state, so that it is possible to appropriately obtain the effect that is preventing occurrence of the engine stall or the like as a result of stop of rotation of the drive power source due to engagement of the lockup clutch when the neutral range is switched to the reverse range.

BRIEF DESCRIPTION OF THE DRAWINGS

FIG. 3 is a table explaining relationships between a plurality of power transmission ranges, and operation states of a plurality of solenoid valves and engagement devices that are provided in the vehicle power transmission apparatus shown in FIG. 1, wherein the power transmission ranges include a D range in which a plurality of drive ranges can be established;

FIG. 7 is a hydraulic circuit diagram showing hydraulic transmission paths in event of an ON failure in which a lockup hydraulic control valve SLU is stuck in its hydraulic output state in the N range shown in FIG. 5.

DETAILED DESCRIPTION OF PREFERRED EMBODIMENTS

The present invention is advantageously applied to a power transmission apparatus for an engine drive vehicle including an engine (internal combustion engine) as a drive power source. However, the present invention is applicable also to a power transmission apparatus for other type of vehicles such as a hybrid electric vehicle including an engine and an electric motor as drive power sources. Each of the first switching valve, second switching valve and third switching valve may be constructed such that its operation state is switched, for example, depending on a signal pressure supplied from an ON-OFF solenoid valve. However, it is possible to switch the operation state of each of these switching valves in any of various arrangements such as an arrangement in which a valve body such a spool valve is moved directly by an ON-OFF solenoid or a drive device other than the solenoid. Each of the switching valves may be configured to be placed in its first connection state with the solenoid being in its energized state and to be placed in its second connection state with the solenoid being in its de-energized state, or may be configured to be placed in its second connection state with the solenoid being in its energized state and to be placed in its first connection state with the solenoid being in its de-energized state. Each of the lockup hydraulic control valve, first hydraulic control valve and second hydraulic control valve is preferably constituted by a linear solenoid valve whose output pressure can be continuously changed depending one an excitation current applied thereto. However, it may be constituted by a valve whose output pressure can be continuously changed by a proportional control or the like. Each of these hydraulic control valves may be one configured to output the hydraulic pressure that is controlled to a predetermined pressure value by its solenoid valve itself, but may be also one configured to control the hydraulic pressure through another hydraulic control valve or the like in accordance with the output pressure of the solenoid valve. Further, the control pressure outputted from the hydraulic control valve may be supplied to the engagement device whereby the engagement device is engaged. However, it is also possible to control an engagement torque of the engagement device in accordance with a control pressure controlled by the hydraulic control valve.

Figure 2:
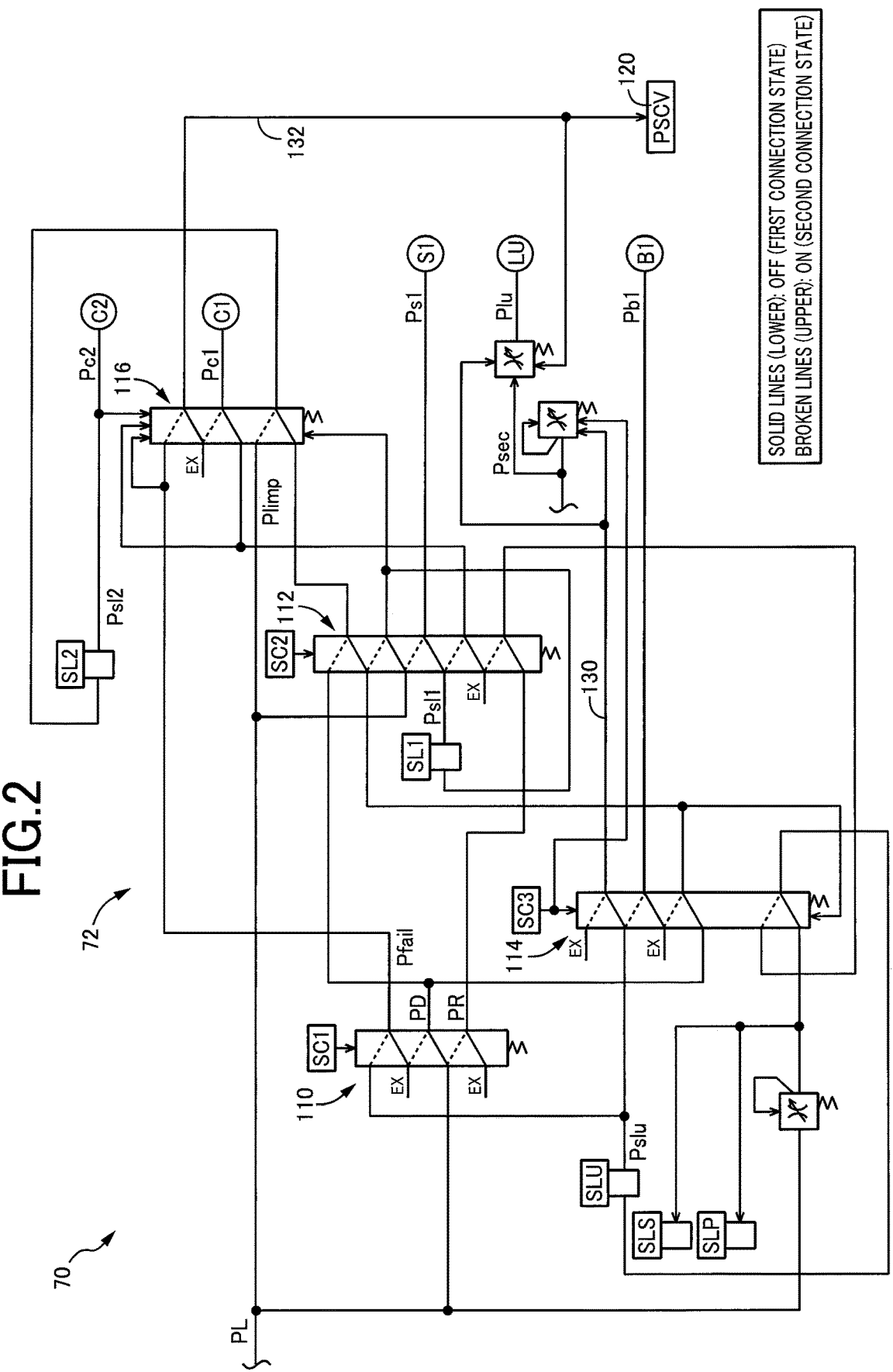
FIG. 2 is a hydraulic circuit diagram explaining a main portion of a hydraulic control unit provided in the vehicle power transmission apparatus shown in FIG. 1.

The vehicle power transmission apparatus of the present invention may be constructed to include the hydraulic control unit shown in FIG. 2, for example. However, the hydraulic control unit shown in FIG. 2 is merely an example, and positions of the second switching valve 112 and the first hydraulic control valve SL1 may be changed as needed, or the second switching valve 112 and the first hydraulic control valve SL1 may be omitted. Each of the other switching valves 110, 114, 116 also may be partially changed, for example, in terms of its connection state. Hydraulic circuits relating to a lockup engagement passage 130 and a lockup release passage 132 also may be changed. The synchronous-meshing clutch S1 as the synchronous-meshing engagement device also may be omitted. FIG. 2 shows the vehicle power transmission apparatus including the automatic transmission defining the first and second power transmission paths, wherein the first power transmission path is provided by the gear power transmission device, the gear-forward-driving frictional engagement device, the gear-reverse-driving frictional engagement device and the synchronous-meshing engagement device, while the second power transmission path is provided by the belt continuously-variable transmission and the belt-driving frictional engagement device. However, the automatic transmission may be modified in any of various manners as long as the modified automatic transmission includes at least the forward-driving engagement device enabling the forward driving and the reverse-driving engagement device enabling the reverse driving. For example, it is also possible to cause the forward-driving clutch C1 as the gear-forward-driving frictional engagement device to be engaged in the fail safe mode. In that case, the second power transmission path provided by the belt continuously-variable transmission and the belt-driving frictional engagement device is not necessarily needed. Thus, the vehicle power transmission apparatus may be modified in any of various manners.

Embodiment

There will be described an embodiment of the present invention in details with reference to drawings. It is noted that figures of the drawings are simplified or deformed as needed, and each portion is not necessarily precisely depicted in terms of dimension ratio, shape, angle, etc, for easier understanding of the embodiment.

Figure 1:
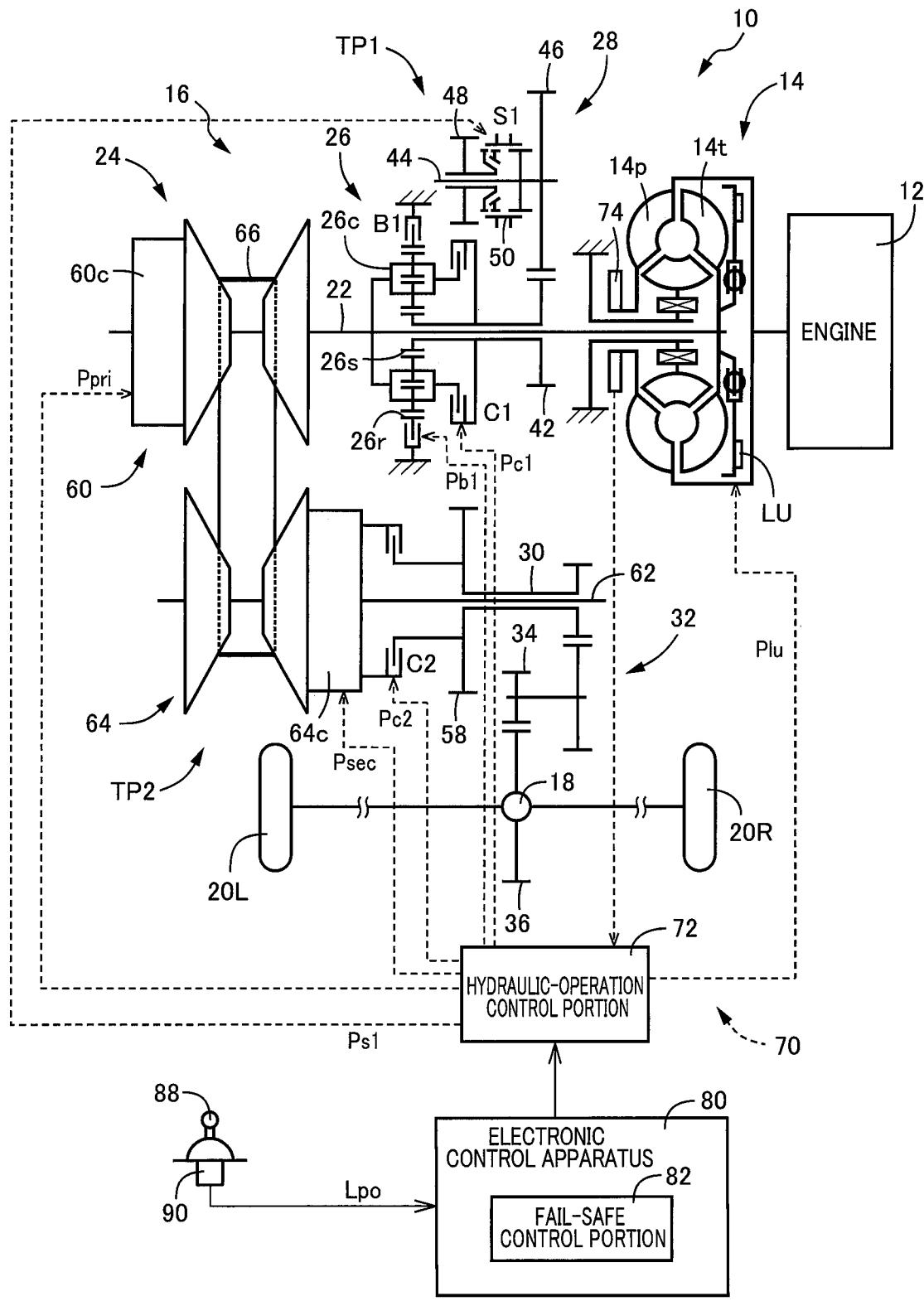
FIG. 1 is a view schematically showing a construction of a vehicle power transmission apparatus according to an embodiment of the present invention.

FIG. 1 is a view schematically showing a construction of a vehicle power transmission apparatus 10 according to an embodiment of the present invention, wherein the view includes a cross-sectional view that is unfolded such that a plurality of axes lie on a single plain. This power transmission apparatus 10 is a horizontal type that is used advantageously for a vehicle of FF (front engine and front drive) type. An output of an engine 12, which serves as a drive power source for driving the vehicle, is transmitted through a torque converter 14 as a fluid transmission device and an automatic transmission 16 to a differential gear device 18, and is distributed to right and left drive wheels 20R, 20L. The engine 12 is an internal combustion engine such as gasoline engine and diesel engine. The torque converter 14 includes a pump impeller 14p connected to a crankshaft of the engine 12 and a turbine impeller 14t connected to an input shaft 22 of the transmission 16, so as to transmit a power of the engine 12 through a fluid (working fluid). The torque converter 14 further includes a lockup clutch LU for a direct connection. The pump impeller 14p is provided with a mechanical fluid pump 74, which is to be driven and rotated by the engine 12 to output a hydraulic pressure so as to serves a hydraulic pressure source for a hydraulic control unit 70 that is represented by broken lines. An arrangement of the fluid pump 74 such as its connection and position may be changed as needed. Further, the fluid pump 74 may be constituted by an electrically-operated pump rather than by the mechanically-operated pump.

FIG. 2 shows, by way of example, a main part of the hydraulic control unit 70, namely, a hydraulic-operation control portion 72 that is constituted by valve bodies, or the like. A lockup engagement pressure Plu, which is an engagement pressure of the lockup clutch LU of the torque converter 14, is regulated by a lockup hydraulic control valve SLU, so that an operation state of the lockup clutch LU is controlled based on the lockup engagement pressure Plu. The lockup engagement pressure Plu is a hydraulic pressure for controlling a pressure difference between a lockup-engaging-side fluid chamber and a lockup-releasing-side fluid chamber, for example. The lockup hydraulic control valve SLU is a linear solenoid valve for hydraulic control, and its output pressure Pslu is electrically controlled by an electronic control apparatus 80 to regulate the lockup engagement pressure Plu. The output pressure Pslu may be referred also to as a control pressure Pslu. The same is true for other hydraulic control valves.

The automatic transmission 16 includes: an input shaft 22 that is provided integrally with a turbine shaft as an output rotational member of the torque converter 14; a belt continuously-variable transmission 24 connected to the input shaft 22; a forward/reverse switching device 26 and a gear transmission mechanism 28 which are connected to the input shaft 22 and which are disposed in parallel to the belt continuously-variable transmission 24; an output shaft 30 as an output rotational member that is common to the belt continuously-variable transmission 24 and the gear transmission mechanism 28; and a reduction gear device 32, wherein a small-diameter gear 34 of the reduction gear device 32 meshes with a ring gear 36 of the differential gear device 18. In the thus constructed automatic transmission 16, the output of the engine 12 is transmitted to the output shaft 30 through the torque converter 14 and the belt continuously-variable transmission 24, or to the output shaft 30 through the torque converter 14, the forward/reverse switching device 26 and the gear transmission mechanism 28, without through the belt continuously-variable transmission 24. Then, the output of the engine 12 is transmitted eventually to the right and left drive wheels 20R, 20L through the reduction gear device 32 and the differential gear device 18.

Thus, in the present embodiment, the automatic transmission 16 defines a first power transmission path TP1 and a second power transmission path TP2. In the first power transmission path TP1, the output of the engine 12 is transmitted from the input shaft 22 to the output shaft 30 through the forward/reverse switching device 26 and the gear transmission mechanism 28. In the second power transmission path TP2, the output of the engine 12 is transmitted from the input shaft 22 to the output shaft 30 through the belt continuously-variable transmission 24. These power transmission paths TP1, TP2 are switched to each other depending on a running state of the vehicle. To this end, the automatic transmission 16 includes a forward-driving clutch C1 and a reverse-driving brake B1 for connecting and disconnecting a power transmission through the first power transmission path TP1 and also a belt-driving clutch C2 for connecting and disconnecting a power transmission through the second power transmission path TP2. The first power transmission path TP1 is provided with a synchronous-meshing clutch S1 that is disposed in series with the forward/reverse switching device 26 and the gear transmission mechanism 28, more specifically, disposed on a downstream side of the forward/reverse switching device 26 and the gear transmission mechanism 28. The gear transmission mechanism 28 corresponds to a gear power transmission device provided in the first power transmission path TP1. The forward-driving clutch C1 corresponds to a hydraulically-operated gear-forward-driving frictional engagement device. The reverse-driving brake B1 corresponds to a hydraulically-operated gear-reverse-driving frictional engagement device. The belt-driving clutch C2 corresponds to a hydraulically-operated belt-driving frictional engagement device. The synchronous-meshing clutch S1 corresponds to a hydraulically-operated synchronous-meshing engagement device. In the present embodiment, the belt-driving clutch C2 corresponds to a forward-driving engagement device and the reverse-driving brake B1 corresponds to a reverse-driving engagement device.

The forward/reverse switching device 26 is constituted mainly by a planetary gear device of single pinion type, and includes a sun gear 26s, a carrier 26c and a ring gear 26r. The carrier 26c is connected integrally to the input shaft 22. The sun gear 26s is connected to a small-diameter gear 42 which is disposed coaxially with the input shaft 22 and is rotatable relative to the input shaft 22. The ring gear 26r is selectively stopped to be rotated through the reverse-driving brake B1. The carrier 26c and the sun gear 26s are selectively connected to each other through the forward-driving clutch C1. When the forward-driving clutch C1 is engaged and the reverse-driving brake B1 is released, the input shaft 22 is directly connected to the small-diameter gear 42 so as to establish a forward power transmission state, and the first power transmission path TP1 is established by engagement of the synchronous-meshing clutch S1, so as to enable a forward driving of the vehicle. On the other hand, when the reverse-driving brake B1 is engaged and the forward-driving clutch C1 is released, the small-diameter gear 42 is rotated in an opposite direction opposite to the input shaft 22 so as to establish a reverse power transmission state, and the first power transmission path TP1 is established by engagement of the synchronous-meshing clutch S1, so as to enable a reverse driving of the vehicle. Further, when both of the forward-driving clutch C1 and the reverse-driving brake B1 are released, a neutral state is established to cut off the power transmission through the first power transmission path TP1.

Each of the forward-driving clutch C1 and the reverse-driving brake B1 is a multi-plate hydraulically-operated frictional engagement device in which a plurality of friction members are frictionally engaged by a hydraulic cylinder. A C1 engagement pressure Pc1, which is supplied to the hydraulic cylinder of the forward-driving clutch C1, is regulated and controlled by a first hydraulic control valve SL1 (see FIG. 2) provided in the hydraulic-operation control portion 72, such that an engagement force and an engagement torque capacity of the forward-driving clutch C1 are continuously adjusted. A B1 engagement pressure Pb1, which is supplied to the hydraulic cylinder of the reverse-driving brake B1, is regulated and controlled by a lockup hydraulic control valve SLU (see FIG. 2) provided in the hydraulic-operation control portion 72, such that an engagement force and an engagement torque capacity of the reverse-driving brake B1 are continuously adjusted. The first hydraulic control valve SL1 and the lockup hydraulic control valve SLU are linear solenoid valves for hydraulic controls, and their respective output pressures Psl1, Pslu are electrically controlled by the electronic control apparatus 80 whereby the C1 engagement pressure Pc1 and the B1 engagement pressure Pb1 are regulated. In the present embodiment, the output pressures Psl1, Pslu are supplied as the respective C1 engagement pressure Pc1 and B1 engagement pressure Pb1 to the respective forward-driving clutch C1 and reverse-driving brake B1.

The gear transmission mechanism 28 includes the above-described small-diameter gear 42, a counter shaft 44, a large-diameter gear 46 which is mounted on the counter shaft 44 unrotatably relative to the counter shaft 44 and which meshes with the small-diameter gear 42, and a small-diameter idler gear 48 mounted on the counter shaft 44 coaxially and rotatably relative to the counter shaft 44. The above-described synchronous-meshing clutch S1 is disposed between the counter shaft 44 and the idler gear 48, so as to connect and disconnect a power transmission between the counter shaft 44 and the idler gear 48. The synchronous-meshing clutch S1 is provided with a synchronizing mechanism such as a synchronizer ring. When a clutch hub sleeve 50 is moved, by a hydraulic cylinder (not shown), in a connecting direction, i.e., in a leftward direction as seen in FIG. 1, the idler gear 48 becomes rotatable synchronously with the counter shaft 44 through the synchronizer ring. When the clutch hub sleeve 50 is further moved, the idler gear 48 is connected to the counter shaft 44 so as to be unrotatable relative to the counter shaft 44, through spline teeth provided on an inner circumferential surface of the clutch hub sleeve 50. The hydraulic cylinder of the synchronous-meshing clutch S1 is to be supplied with the S1 engagement pressure Ps1 that is regulated by the first hydraulic control valve SL1 (see FIG. 2) provided in the hydraulic-operation control portion 72, whereby the synchronous-meshing clutch S1 is brought into synchronous-meshing engagement based on the S1 engagement pressure Ps1. The hydraulic cylinder of the synchronous-meshing clutch S1 is to be supplied with also the line pressure PL as the S1 engagement pressure Ps1, whereby the synchronous-meshing clutch S1 is maintained in the meshing engaged state. The line pressure PL is regulated depending on, for example, the accelerator operation amount Acc that corresponds to a requested output amount and a throttle-valve opening degree θth that corresponds to an engine torque. The output pressure Psl1 of the first hydraulic control valve SL1 is electrically controlled by the electronic control apparatus 80 whereby the S1 engagement pressure Ps1 is regulated. In the present embodiment, the output pressure Psl1 is directly supplied as the S1 engagement pressure Ps1 to the synchronous-meshing clutch S1.

The idler gear 48 meshes with a large-diameter gear 58 provided on the output shaft 30. With one of the forward-driving clutch C1 and the reverse-driving brake B1 being engaged and the synchronous-meshing clutch S1 being engaged, the output of engine 12 is transmitted from the input shaft 22 to the output shaft 30, sequentially through the forward/reverse switching device 26, the gear transmission mechanism 28, the idler gear 48 and the large-diameter gear 58, whereby the first power transmission path TP1 is established. Since speed change (deceleration) is performed also between the small-diameter idler gear 48 and the large-diameter gear 58, it can be considered that the gear transmission mechanism 28 is constituted to include also the small-diameter idler gear 48 and the large-diameter gear 58.

The belt continuously-variable transmission 24 includes a primary sheave 60 having a variable effective diameter and provided on the input shaft 22, a secondary sheave 64 having a variable effective diameter provided on the rotary shaft 62 coaxial with the output shaft 30, and a transmission belt 66 is mounted between the pair of variable sheaves 60, 64, so that a power transmission is performed owing to friction between the transmission belt 66 and the pair of variable sheaves 60, 64. The pair of variable sheaves 60, 64 are provided with respective hydraulic cylinders 60c, 64c each of which serves as a hydraulic actuator configured to apply a thrust force to change a width of a V-shaped groove defined in a corresponding one of the variable sheaves 60, 64. A primary pressure Ppri, which is supplied to the hydraulic cylinder 60c of the primary sheave 60, is controlled by a primary hydraulic control valve SLP (see FIG. 2) provided in the hydraulic-operation control portion 72, whereby the width of the V-shaped groove defined in each of the variable sheaves 60, 64 is changed and accordingly the effective diameter (hanging diameter) of the transmission belt 66 is changed, so that a gear ratio γ2 of the belt-type continuously-variable transmission 24 is continuously changed. The primary pressure Ppri is controlled by the primary hydraulic control valve SLP, for example, such that a rotational speed (input rotational speed) Nin of the input shaft 22, which is a rotational speed of the primary sheave 60, becomes substantially equal to a target speed value corresponding to the gear ratio γ2. Further, a secondary pressure Psec, which is supplied to the hydraulic cylinder 64c of the secondary sheave 64, is controlled by a secondary hydraulic control valve SLS (see FIG. 2) provided in the hydraulic-operation control portion 72, whereby a belt clamping force is adjusted to prevent slipping of the transmission belt 66. The primary and secondary hydraulic control valves SLP, SLS are linear solenoid valves for hydraulic controls, and their respective primary and second pressures Ppri, Psec are electrically controlled by the electronic control apparatus 80 whereby the primary and second pressures Ppri, Psec are regulated.

The output shaft 30 is mounted on the rotary shaft 62 coaxially and rotatably relative to the rotary shaft 62. The above-described belt-driving clutch C2 is disposed between the output shaft 30 and the secondary sheave 64, so as to connect and disconnect a power transmission between the output shaft 30 and the secondary sheave 64. With the belt-driving clutch C2 being engaged, the output of the engine 12 is transmitted from the input shaft 22 to the output shaft 30 through the belt continuously-variable transmission 24, thereby establishing the second power transmission path TP2 and enabling the forward driving of the vehicle. The belt-driving clutch C2 is a multi-plate hydraulically-operated frictional engagement device in which a plurality of friction members are frictionally engaged by a hydraulic cylinder. A C2 engagement pressure Pc2, which is supplied to the hydraulic cylinder of the belt-driving clutch C2, is controlled by a second hydraulic control valve SL2 (see FIG. 2) provided in the hydraulic-operation control portion 72 whereby an engagement force and an engagement torque capacity of the belt-driving clutch C2 are continuously controlled. The second hydraulic control valve SL2 is a linear solenoid valve for hydraulic control, and an output pressure Psl2 of the second hydraulic control valve SL2 is electrically controlled by the electronic control apparatus 80 whereby the C2 engagement pressure Pc2 is regulated. In the present embodiment, the output pressure Psl2 is directly supplied as the C2 engagement pressure Pc2 to the belt-driving clutch C2.

In the power transmission apparatus 10 constructed as described above, a gear ratio γ1 of the first power transmission path TP1, which is dependent on a gear ratio of the gear transmission mechanism 28, for example, is higher than a maximum value γ2max of the gear ratio γ2 of the second power transmission path TP2. Therefore, the vehicle is driven in a gear driving mode using the first power transmission path TP1 when the vehicle starts running or when the vehicle runs with high load, and the gear driving mode is switched to a belt driving mode using the second power transmission path TP2 when a running speed V of the vehicle is increased or when a requested drive force is reduced. The switching (shifting-up) from the gear driving mode to the belt driving mode is performed by so-called "clutch-to-clutch" in which the forward-driving clutch C1 is released while the belt-driving clutch C2 is engaged. Further, a switching (shifting-down) from the belt driving mode to the gear driving mode is performed by "clutch-to-clutch" in which the belt-driving clutch C2 is released while the forward-driving clutch C1 is engaged. Each of the gear ratios γ1, γ2 is a ratio (Nin/Nout) of the input rotational speed Nin to the output rotational speed (rotational speed of the output shaft 3) Nout. The gear ratio γ1 and the maximum value γ2max of the gear ratio γ2 are both higher than 1.0, so that the output shaft 30 is rotated at a lower speed than the input shaft 22. The output rotational speed Nout corresponds to the vehicle running speed V. The input rotational speed Nin is equal to the turbine rotational speed Nt.

As shown in FIG. 2, the hydraulic control unit 70 includes, in addition to the above-described hydraulic control valve SLP, SLS, SLU, SL1, SL2, a first switching valve 110, a second switching valve 112, a third switching valve 114, ON-OFF solenoid valves SC1, SC2, SC3, a failure switching valve 116 and a primary-sheave control valve (PSCV) 120.

The first switching valve 110 is a spool valve configured to switch fluid paths depending on presence or absence of a signal pressure supplied from the ON-OFF solenoid valve SC1, and is to be selectively placed in its first connection state indicated by solid lines and its second connection sate indicated by broken lines. When being placed in the first connection state, the first switching valve 110 outputs the line pressure PL as a D-range pressure PD, to the second switching valve 112 and the third switching valve 114. When being placed in the second connection state, the first switching valve 110 outputs the line pressure PL as an R-range pressure PR, to the second switching valve 112, and outputs the output pressure Pslu of the lockup hydraulic control valve SLU as a failure pressure Pfail, to the failure switching valve 116. The D-range pressure PD is used as a source pressure for the C1 engagement pressure Pc1 of the forward-driving clutch C1, and a source pressure for the C2 engagement pressure Pc2 of the belt-driving clutch C2. The R-range pressure PR is used as a source pressure of the B1 engagement pressure Pb1 of the reverse-driving brake B1. In the present embodiment, the first switching valve 110 is placed in the first connection state as indicated by solid lines owing to a biasing force of a spring with the signal pressure being not supplied thereto from the ON-OFF solenoid valve SC1 when the ON-OFF solenoid valve SC1 is in its de-energized state (OFF), and is placed in the second connection state as indicated by broken lines with the signal pressure being supplied thereto from the ON-OFF solenoid valve SC1 when the ON-OFF solenoid valve SC1 is in its energized state (ON). When the D-range for the forward driving is selected by a shift lever 88, the ON-OFF solenoid valve SC1 is turned OFF, so that the first switching valve 110 is placed in the first connection state whereby the D-range pressure PD is outputted. When the R range for the reverse driving is selected by the shift lever 88, the ON-OFF solenoid valve SC1 is turned ON, so that the first switching valve 110 is placed in the second connection state whereby the R-range pressure PR is outputted. It is noted that, in the present embodiment, when the N range or the P range is selected, the ON-OFF solenoid valve SC1 is turned ON, so that the first switching valve 110 is placed in the second connection state The second switching valve 112 is a spool valve configured to switch fluid paths depending on presence or absence of a signal pressure supplied from the ON-OFF solenoid valve SC2, and is to be selectively placed in its first connection state indicated by solid lines and its second connection sate indicated by broken lines. When being placed in the first connection state, the second switching valve 112 outputs the D-range pressure PD that is supplied through the third switching valve 114 when the first switching valve 110 is placed in the first connection state, to the failure switching valve 116, outputs the line pressure PL to the first hydraulic control valve SL1, outputs the same line pressure PL as a failure switching control pressure to the failure switching valve 116, outputs a control pressure Psl1 regulated by the first hydraulic control valve SL1, as the S1 engagement pressure Ps1, to the synchronous-meshing clutch S1, and outputs the R-range pressure PR that is supplied when the first switching valve 110 is placed in the second connection state, to the third switching valve 114. When being placed in the second connection state, the second switching valve 112 outputs the D-range pressure PD that is supplied when the first switching valve 110 is placed in the first connection state, to the failure switching valve 116, outputs the D-range pressure PD that is supplied through the third switching valve 114 when the first switching valve 110 is placed in the first connection state, to the first hydraulic control valve SL1, outputs the same D-range pressure PD as the failure switching control pressure, to the failure switching valve 116, outputs the control pressure Psl1 regulated by the first hydraulic control valve SL1, to the failure switching valve 116, and outputs the line pressure PL as the S1 engagement pressure Ps1, to the synchronous-meshing clutch S1. That is, the control pressure Psl1 regulated by the first hydraulic control valve SL1 using the line pressure PL or the D-range pressure PD as a source pressure is supplied as the S1 engagement pressure Ps1 to the synchronous-meshing clutch S1 when the second switching valve 112 is placed in the first connection state, and is supplied as the C1 engagement pressure Pc1 to the forward-driving clutch C1 through the failure switching valve 116 when the second switching valve 112 is placed in the second connection state. Thus, the first hydraulic control valve SL1 is used as a common hydraulic control valve for controlling hydraulic pressures of the forward-driving clutch C1 and the synchronous-meshing clutch S1. In the present embodiment, the second switching valve 112 is placed in the first connection state as indicated by solid lines owing to a biasing force of a spring with the signal pressure being not supplied thereto from the ON-OFF solenoid valve SC2 when the ON-OFF solenoid valve SC2 is in its de-energized state (OFF), and is placed in the second connection state as indicated by broken lines with the signal pressure being supplied thereto from the ON-OFF solenoid valve SC2 when the ON-OFF solenoid valve SC2 is in its energized state (ON).

The third switching valve 114 is a spool valve configured to switch fluid paths depending on presence or absence of a signal pressure supplied from the ON-OFF solenoid valve SC3, and is to be selectively placed in its first connection state indicated by solid lines and its second connection sate indicated by broken lines. When being placed in the first connection state, the third switching valve 114 outputs the line pressure to the lockup hydraulic control valve SLU, outputs the control pressure Pslu regulated by the lockup hydraulic control valve SLU, to a lockup engagement passage 130 for controlling the engagement pressure Plu of the lockup clutch LU, and outputs the D-range pressure PD that is supplied when the first switching valve 110 is placed in the first connection state, to the second switching valve 112. When being placed in the second connection state, the third switching valve 114 outputs the R-range pressure PR that is supplied when the first switching valve 110 and the second switching valve 112 are placed in the second connection state and the first connection state, respectively, to the lockup hydraulic control valve SLU, and outputs the control pressure Pslu regulated by the lockup hydraulic control valve SLU, as the B1 engagement pressure Pb1 to the reverse-driving brake B1. That is, the control pressure Pslu regulated by the lockup hydraulic control valve SLU using the line pressure PL or the R-range pressure PR as a source pressure is supplied as a controlling pressure for the lockup engagement pressure Plu, to the lockup engagement passage 130 when the third switching valve 114 is placed in the first connection state, and is supplied as the B1 engagement pressure Pb1 to the reverse-driving brake B1 when the third switching valve 114 is placed in the second connection state. Thus, the lockup hydraulic control valve SLU is used as a common hydraulic control valve for controlling hydraulic pressures of the lockup clutch LU and the reverse-driving brake B1. In the present embodiment, the third switching valve 114 is placed in the first connection state as indicated by solid lines owing to a biasing force of a spring with the signal pressure being not supplied thereto from the ON-OFF solenoid valve SC3 when the ON-OFF solenoid valve SC3 is in its de-energized state (OFF), and is placed in the second connection state as indicated by broken lines with the signal pressure being supplied thereto from the ON-OFF solenoid valve SC3 when the ON-OFF solenoid valve SC3 is in its energized state (ON).

The failure switching valve 116 is a spool valve that is to be selectively placed in its first connection state indicated by solid lines and its second connection sate indicated by broken lines. When being placed in the first connection state, the failure switching valve 116 outputs the D-range pressure PD that is supplied when the first and second switching valves 110, 112 are placed in the respective first and second connection states and when the first, third and second switching valves 110, 114, 112 are placed in the respective first connection states, to the second hydraulic control valve SL2, and outputs the control pressure Psl1 of the first hydraulic control valve SL1 that is supplied when the first, third and second switching valves 110, 114, 112 are placed in the first, first and second connection states, respectively, as the C1 engagement pressure Pc1 to the forward-driving clutch C1. When being placed in the second connection state, the failure switching valve 116 outputs the line pressure PL that is supplied through a path separate from the D-range pressure PD, as an evacuation pressure Plimp to the second hydraulic control valve SL2, and outputs the failure pressure Pfail that is supplied when the first switching valve 110 is placed in the second connection state, to the lockup release passage 132 for forcibly releasing the lockup clutch LU. That is, the control pressure Psl1 regulated by the first hydraulic control valve SL1 using the D-range pressure PD as a source pressure is supplied as the C1 engagement pressure Pc1 to the forward-driving clutch C1 when the failure switching valve 116 is placed in the first connection state. Thus, the first hydraulic control valve SL1 is used as a common hydraulic control valve for controlling hydraulic pressures of the forward-driving clutch C1 and the synchronous-meshing clutch S1. The lockup release passage 132 is connected also to the PSCV 120, so that, when the failure switching valve 116 is placed in the second connection state to supply the failure pressure Pfail to the PSCV 120, the primary pressure Ppri of the belt continuously-variable transmission 24 is reduced whereby the gear ratio γ2 is made higher than normal.

The failure switching valve 116 is mechanically placed in the second connection state when the failure pressure Pfail is supplied to the failure switching valve 116, and is mechanically placed in the first connection state when supply of the failure pressure Pfail to the failure switching valve 116 is stopped. However, when the line pressure PL or the D-range pressure PD is supplied as the failure switching control pressure from the second switching valve 112 to the failure switching valve 116, the placement of the failure switching valve 116 into the second connection state by the failure pressure Pfail is restricted by effect of the line pressure PL or the D-range pressure PD.

The second hydraulic control valve SL2 is disposed between the failure switching valve 116 and the belt-driving clutch C2, and uses the D-range pressure PD or the evacuation pressure Plimp supplied from the failure switching valve 116 as a source pressure to control the hydraulic pressure. The output pressure Psl2 as the control pressure of the second hydraulic control valve SL2 is supplied as the C2 engagement pressure Pc2 to the belt-driving clutch C2. Thus, the operation state of the belt-driving clutch C2 is controlled based on the output pressure Psl2 of the second hydraulic control valve SL2, for thereby enabling the forward driving (belt driving) by the second power transmission path TP2 provided by the belt continuously-variable transmission 24.

In the hydraulic control unit 70 constructed as described above, it is possible to establish a plurality of power transmission ranges P, N, R, D in accordance with an operation position Lpo of the shift lever 88, as shown in FIG. 3. As the operation position Lpo of the shift lever 88, there are a D position, an R position, an N position and a P position. That is, the shift lever 88 is placed in the D position to select a D (drive) range for the forward driving, the R position to select an R (reverse) range for the reverse driving, the N position to select an N (neutral) range, and the P position to select a P (parking) range for parking the vehicle. The above-described solenoid valves SC1, SC2, SC3, SL1, SL2, SLU are controlled by the electronic control apparatus 80 in accordance with the operation position Lpo of the shift lever 88, such that the operation states of the respective engagement devices in the form of the clutches C1, C2, S1, LU and the brake B1 are controlled to establish a selected one of the P range, N range, R range and D range that are different in power transmission state.

Figure 5:
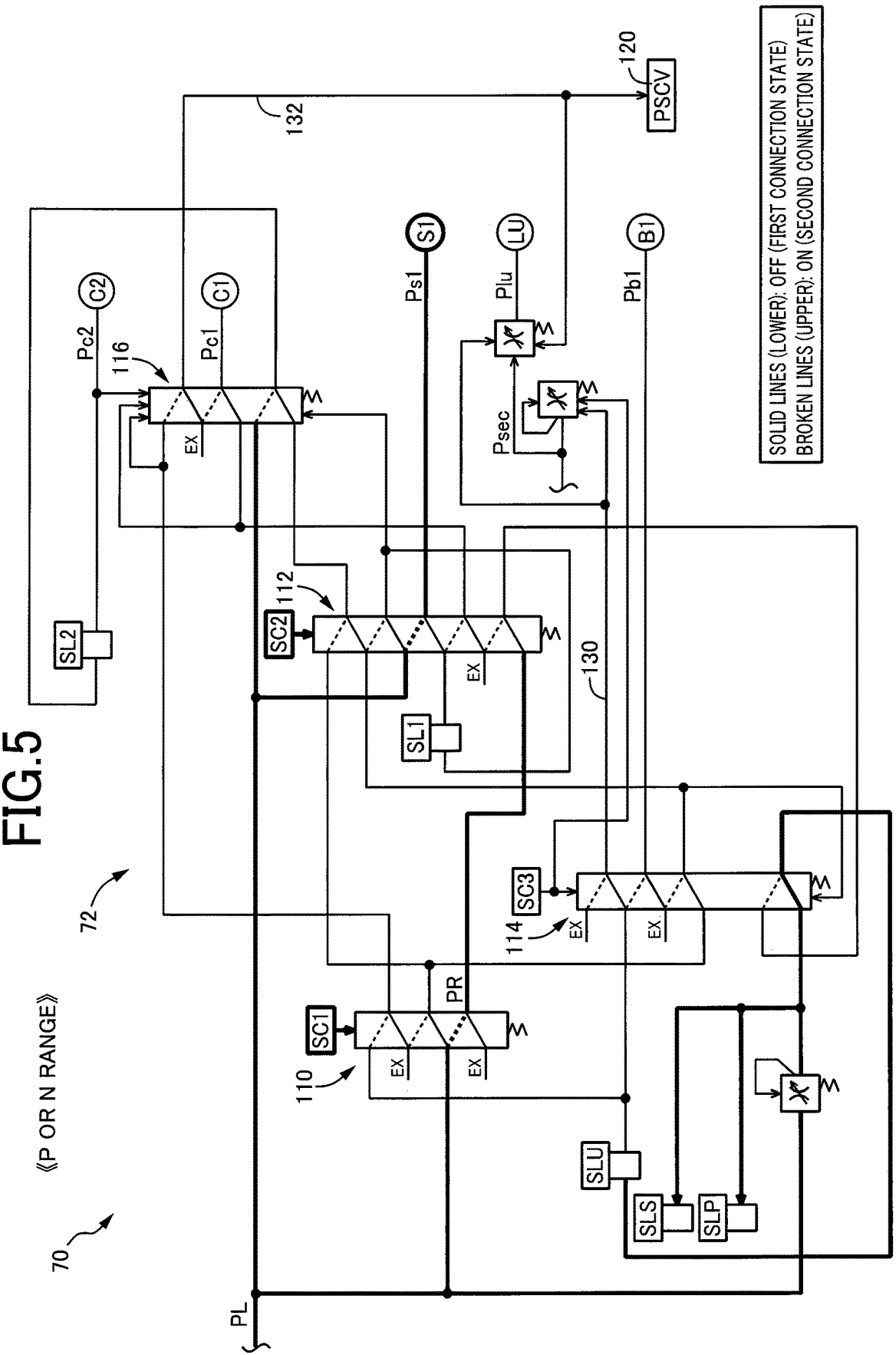
FIG. 5 is a hydraulic circuit diagram showing hydraulic transmission paths when an N range is selected in the vehicle power transmission apparatus shown in FIG. 1, wherein the hydraulic transmission paths are indicated by thick lines.

In the P range and the N range, each of the ON-OFF solenoid valves SC1 and SC2 is turned ON, the ON-OFF solenoid valve SC3 is turned OFF, and each of the hydraulic control valves SL1, SL2, SLU is turned OFF (for stopping the output pressure). FIG. 5 is a hydraulic circuit diagram showing hydraulic transmission paths in this state, wherein the hydraulic transmission paths are indicated by thick lines. As shown in FIG. 5, the first switching valve 110 is in the second connection state, the second switching valve 112 is in the second connection state, the third switching valve 114 is in the first connection state, and the failure switching valve 116 is in the first connection state, whereby the clutches C1, C2, the reverse-driving brake B1 and the lockup clutch LU are released while the synchronous-meshing clutch S1 is engaged, thereby establishing the neutral state in which the power transmission is cut off. In the present embodiment, the synchronous-meshing clutch S1 is engaged with the second switching valve 112 being placed in the second connection state and with the first hydraulic control valve SL1 being turned OFF. However, it is also possible to release the synchronous-meshing clutch S1, place the second switching valve 112 in the first connection state or turn the first hydraulic control valve SL1 ON.

Figure 6:
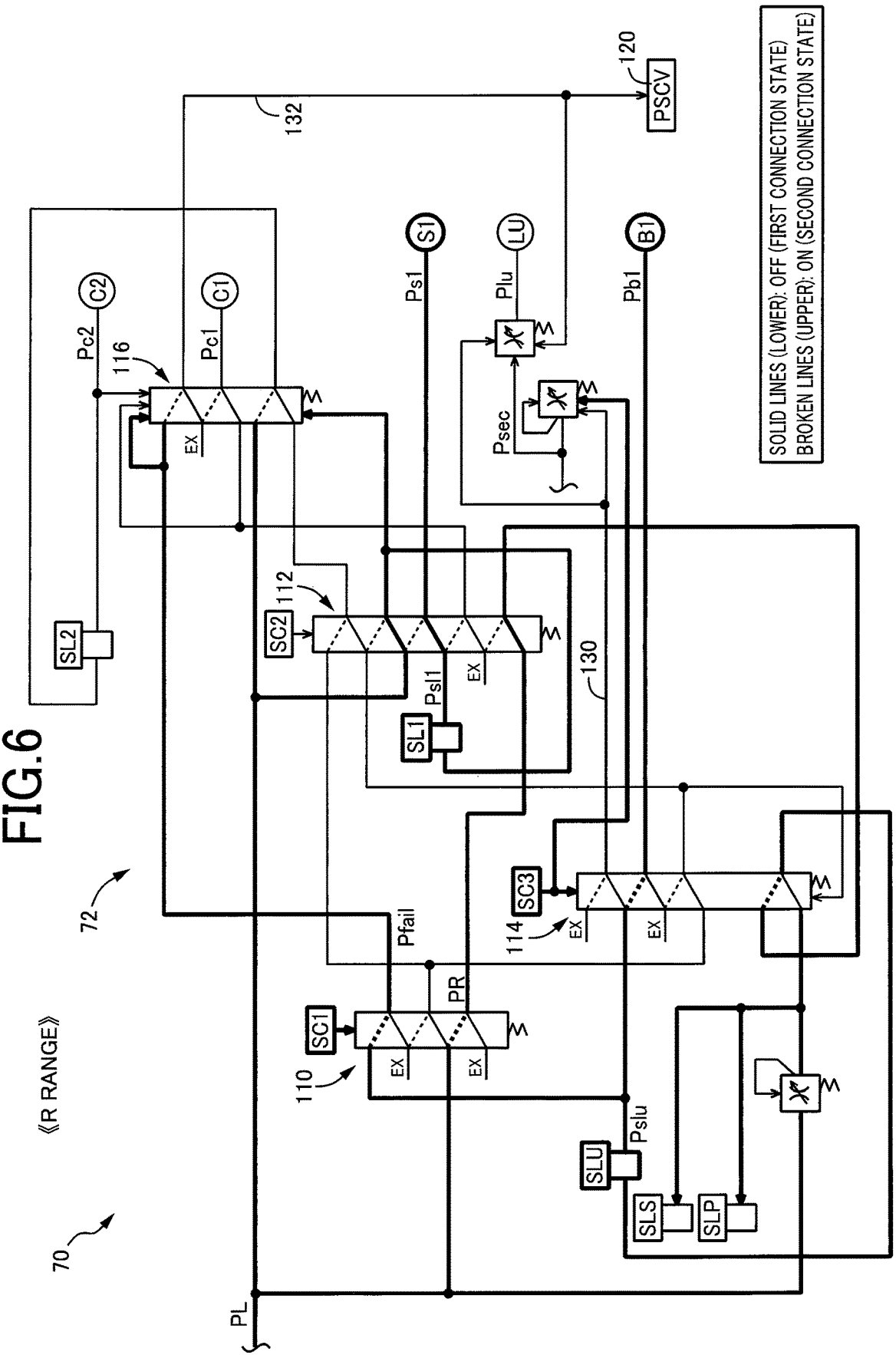
FIG. 6 is a hydraulic circuit diagram showing hydraulic transmission paths when an R range is selected in the vehicle power transmission apparatus shown in FIG. 1, wherein the hydraulic transmission paths are indicated by thick lines.

In the R range, each of the ON-OFF solenoid valves SC1 and SC3 is turned ON, the ON-OFF solenoid valve SC2 is turned OFF, each of the first hydraulic control valve SL1 and the lockup hydraulic control valve SLU is turned ON (for outputting the output pressure), and the second hydraulic control valve SL2 is turned OFF. FIG. 6 is a hydraulic circuit diagram showing hydraulic transmission paths in this state, wherein the hydraulic transmission paths are indicated by thick lines. As shown in FIG. 6, the first switching valve 110 is in the second connection state, the second switching valve 112 is in the first connection state, the third switching valve 114 is in the second connection state, and the failure switching valve 116 is in the first connection state, whereby the reverse-driving brake B1 and the synchronous-meshing clutch S1 are engaged while the clutches C1, C2 and the lockup clutch LU are released, thereby establishing a reverse driving mode in which the reverse driving is enabled with the power being transmitted through the gear transmission mechanism 28.

In the D range, the gear driving mode, low-speed belt driving mode, high-speed belt driving mode and fail safe mode can be established. In the gear driving mode, each of the ON-OFF solenoid valves SC1 and SC3 is tuned OFF, the ON-OFF solenoid valve SC2 is turned ON, the first hydraulic control valve SL1 is turned ON, and the second hydraulic control valve SL2 is turned OFF, whereby the first switching valve 110 is in the first connection state, the second switching valve 112 is in the second connection state, the third switching valve 114 is in the first connection state and the failure switching valve 116 is in the first connection state, so that the forward-driving clutch C1 and the synchronous-meshing clutch S1 are engaged while the belt-driving clutch C2 and the reverse-driving brake B1 are released, for thereby enabling the forward driving by the gear driving with the power transmitted through the gear transmission mechanism 28.

In the low-speed belt driving mode, each of the ON-OFF solenoid valves SC1 and SC3 is tuned OFF, the ON-OFF solenoid valve SC2 is turned ON, the first hydraulic control valve SL1 is turned OFF, and the second hydraulic control valve SL2 is turned ON, whereby the first switching valve 110 is in the first connection state, the second switching valve 112 is in the second connection state, the third switching valve 114 is in the first connection state and the failure switching valve 116 is in the first connection state, so that the belt-driving clutch C2 and the synchronous-meshing clutch S1 are engaged while the forward-driving clutch C1 and the reverse-driving brake B1 are released, for thereby enabling the forward driving by the belt driving with the power transmitted through the belt continuously-variable transmission 24.

In the high-speed belt driving mode, each of the ON-OFF solenoid valves SC1, SC2 and SC3 is tuned OFF, the first hydraulic control valve SL1 is turned OFF, and the second hydraulic control valve SL2 is turned ON, whereby the first switching valve 110 is in the first connection state, the second switching valve 112 is in the first connection state, the third switching valve 114 is in the first connection state and the failure switching valve 116 is in the first connection state, so that the second belt-driving clutch C2 is engaged while the forward-driving clutch C1, the reverse-driving brake B1 and the synchronous-meshing clutch S1 are released, for thereby enabling the forward driving by the belt driving with the power transmitted through the belt continuously-variable transmission 24.

In the above-described gear driving mode, low-speed belt driving mode and high-speed belt driving mode of the D range, the lockup hydraulic control valve SLU is turned ON under a certain condition, and the lockup engagement pressure Plu is regulated based on the output pressure Pslu whereby the lockup clutch LU is placed in fully engaged state or slip-engaged state. When the lockup hydraulic control valve SLU is turned OFF, the lockup clutch LU is released.

Figure 4:
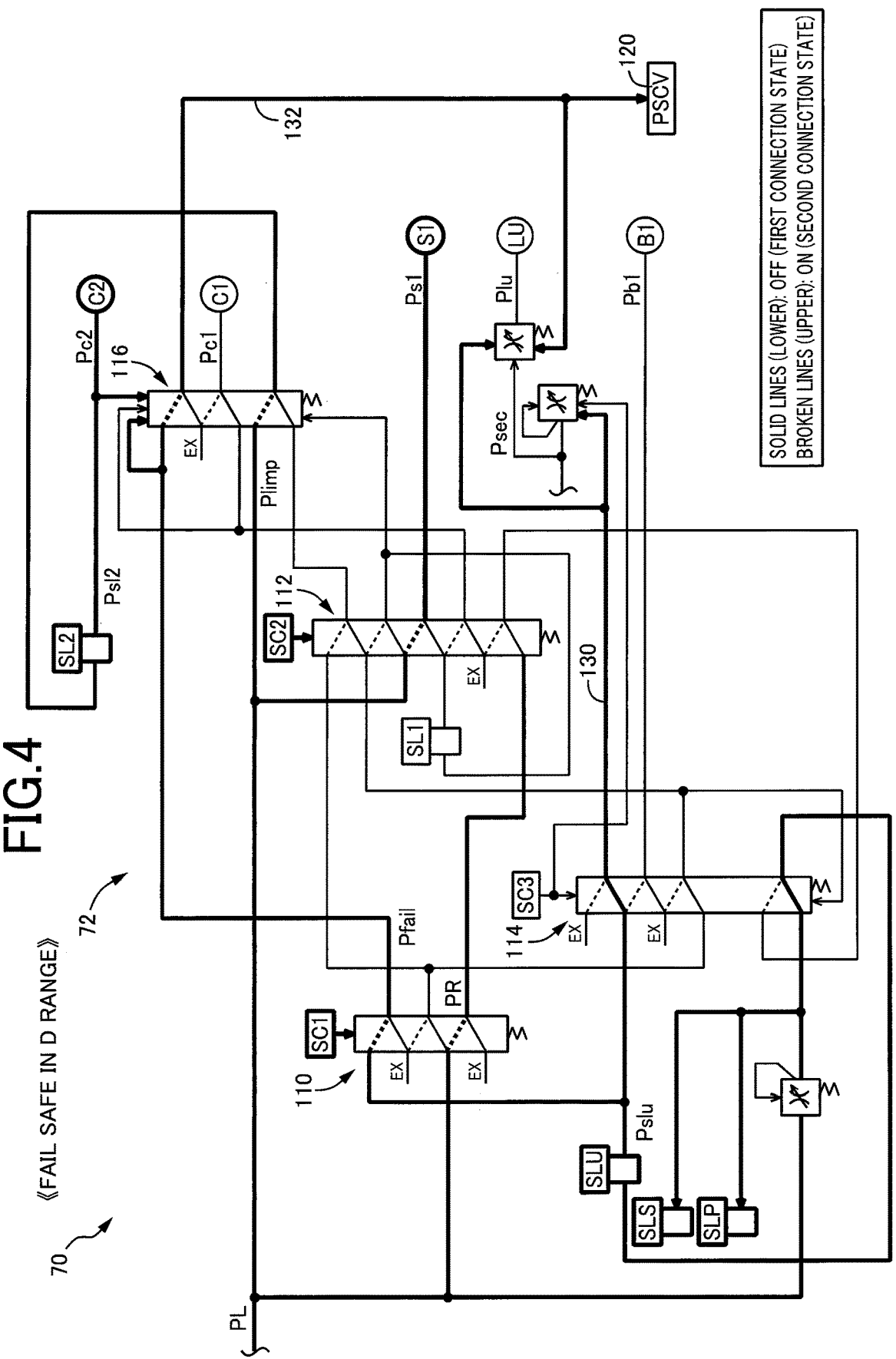
FIG. 4 is a hydraulic circuit diagram showing hydraulic transmission paths when a fail safe mode of the D range is established in the vehicle power transmission apparatus shown in FIG. 1, wherein the hydraulic transmission paths are indicated by thick lines.

The fail safe mode a mode that is established when there is a possibility of the ON failure in which the lockup hydraulic control valve SLU is stuck in the hydraulic output state. In this fail safe mode, each of the ON-OFF solenoid valves SC1, SC2 is turned ON, the ON-OFF solenoid valve SC3 is turned OFF, the first hydraulic control valve SL1 is turned OFF, and each of the second hydraulic control valve SL2 and the lockup hydraulic control valve SLU is placed ON. FIG. 4 is a hydraulic circuit diagram showing hydraulic transmission paths in this state, wherein the hydraulic transmission paths are indicated by thick lines. As shown in FIG. 4, the first switching valve 110 is in the second connection state, the second switching valve 112 is in the second connection state, the third switching valve 114 is in the first connection state, and the failure switching valve 116 is in the second connection state, whereby the belt-driving clutch C2 and the synchronous-meshing clutch S1 are engaged while the forward-driving clutch C1, the reverse-driving brake B1 and the lockup clutch LU are released, thereby enabling the forward driving by the belt driving with the power transmitted through the belt continuously-variable transmission 24.

That is, in the fail safe mode, with the output pressure Pslu of the lockup hydraulic control valve SLU being supplied as the failure pressure Pfail to the failure switching valve 116, the failure switching valve 116 is placed in the second connection state indicated by broken lines whereby the evacuation pressure Plimp is supplied to the second hydraulic control valve SL2, and the belt-driving clutch C2 is engaged by the control pressure of the second hydraulic control valve SL2, thereby enabling the forward driving using the belt continuously-variable transmission 24. Further, with the failure pressure Pfail being outputted from the failure switching valve 116 to the lockup release passage 132, the primary pressure Ppri of the belt continuously-variable transmission 24 is reduced through the PSCV 120 so that the forward driving is performed with the gear ratio γ2 being made higher than normal. On the other hand, the output pressure Pslu of the lockup hydraulic control valve SLU is outputted from the third switching valve 114 placed in the first connection state to the lockup engagement passage 130 so as to serve as the controlling pressure for the lockup engagement pressure Plu. However, the lockup engagement pressure Plu is offset by the failure pressure Pfail supplied to the lockup release passage 132 from the failure switching valve 116, so that the lockup clutch LU is held in the released state. Therefore, in event of the ON failure in which the lockup hydraulic control valve SLU is actually stuck in the hydraulic output state, an evacuation driving of the vehicle can be appropriately performed with the lockup clutch LU being held in the released state. In the present embodiment, the synchronous-meshing clutch S1 is engaged with the second switching valve 112 being placed in the second connection state and with the first hydraulic control valve SL1 being turned OFF. However, it is also possible to release the synchronous-meshing clutch S1, place the second switching valve 112 in the first connection state or turn the first hydraulic control valve SL1 ON.

The vehicle power transmission apparatus 10 constructed as described above includes the electronic control apparatus 80 as a controller configured to execute a control for switching among the P range, R range, N range and D range shown in FIG. 3, a control for switching among the plurality of driving modes in the D range, a control for the gear ratio of the belt continuously-variable transmission 24, a control for the belt clamping force of the belt continuously-variable transmission 24 and a control for the operation state of the lockup clutch LU, for example. The electronic control apparatus 80 includes a so-called microcomputer incorporating a CPU, a ROM, a RAM and an input-output interface, such that the CPU performs various control operations, by processing various input signals, according to control programs stored in the ROM, while utilizing a temporary data storage function of the RAM. The electronic control apparatus 80 is configured to receive various information required to perform various control operations, such as an output signal of an operation position sensor 90 indicative of an operation position Lpo that is an operation position of the shift lever 88, an output signal indicative of the turbine rotational speed Nt, an output signal indicative of the output rotational speed Nout corresponding to the vehicle running speed V, and an output signal indicative of the accelerator operation amount Acc that is an amount of operation of an accelerator pedal of the vehicle. The accelerator operation amount Acc corresponds to a requested drive force that is requested by the vehicle driver. Although the electronic control apparatus 80 corresponds to a control apparatus of the power transmission apparatus 10, the electronic control apparatus 80 may be configured to execute also other controls such as a control of the output of the engine 12.

The electronic control apparatus 80 functionally includes a fail-safe control portion 82 that is configured, when the D range is selected by the shift lever 88 in event of detection of a predetermined anomaly with a possibility of an ON failure in which the lockup hydraulic control valve SLU is stuck in the hydraulic output state, to establish the fail safe mode for enabling the forward driving of the vehicle even if the lockup hydraulic control valve SLU actually suffers from the ON failure. The lockup hydraulic control valve SLU is used for controlling both of the engagement pressure Plu of the lockup clutch LU and the engagement pressure Pb1 of the reverse-driving brake B1, and the third switching valve 114 is held in the first connection state except in the reverse driving. Therefore, if the lockup hydraulic control valve SLU suffers from the ON failure, the lockup clutch LU is always in the engaged state except in the reverse driving, whereby the engine 12 as the drive power source is connected directly to the drive wheels 20R, 20L, thereby causing a risk of an engine stall in which rotation of the engine 12 is stopped when the vehicle is stopped. In other words, in a case in which the engine stall occurs when the vehicle is stopped in the forward driving, it can be determined that the lockup hydraulic control valve SLU is likely to suffer from the ON failure. That is, the above-described event of detection of the predetermined anomaly may include the case in which the engine stall occurs when the vehicle is stopped in the forward driving. The ON failure of the lockup hydraulic control valve SLU could be caused, for example, by malfunction of the valve body such as the spool valve due to a short circuit or disconnection of an electric circuit, or foreign matter being caught.

The fail-safe control portion 82 establishes the fail safe mode when the D range is selected in the event of detection of the anomaly. Therefore, when the P range, N range or R range is selected, the P range, N range or R range shown in FIG. 3 is used in accordance with a normal range switch control. For example, when the N range is selected by the shift lever 88, each of the ON-OFF solenoid valves SC1, SC2 is turned ON, the ON-OFF solenoid valve SC3 is turned OFF and each of the hydraulic control valves SL1, SL2, SLU is turned OFF, as shown in FIG. 3. In this instance, if the lockup hydraulic control valve SLU does not actually suffer from the ON failure, the first switching valve 110 is placed in the second connection state, the second switching valve 112 is placed in the second connection state, the third switching valve 114 is placed in the first connection state and the failure switching valve 116 is placed in the first connection state, as shown in FIG. 5, whereby the clutches C1, C2, reverse-driving brake B1 and lockup clutch LU are released while the synchronous-meshing clutch S1 is engaged, thereby establishing the neutral state in which the power transmission is cut off.

On the other hand, in a case in which the lockup hydraulic control valve SLU actually suffers from the ON failure, the output pressure Pslu of the lockup hydraulic control valve SLU is outputted to the lockup engagement passage 130, and the failure pressure Pfail based on the output pressure Pslu is supplied to the failure switching valve 116 whereby the failure switching valve 116 is placed in the second connection state, so that the evacuation pressure Plimp is supplied to the second hydraulic control valve SL2, and the failure pressure Pfail is outputted to the lockup release passage 132, as shown in FIG. 7. That is, the state is practically the same as the fail safe mode in FIG. 4, but the second hydraulic control valve SL2 is turned OFF, namely, the output of the second hydraulic control valve SL2 is stopped, whereby the belt-driving clutch C2 is released, thereby holding the neutral state in which the power transmission is cut off.

Further, when the R range is selected by the shift lever 88, each of the ON-OFF solenoid valves SC1, SC3 is turned ON, the ON-OFF solenoid valve SC2 is OFF, each of the hydraulic control valves SL1, SLU is turned ON, and the second hydraulic control valve SL2 is tuned OFF, as shown in FIG. 3. Thus, irrespective of whether the lockup hydraulic control valve SLU actually suffers from the ON failure or not, the reverse-driving brake B1 is engaged based on the output pressure Pslu of the lockup hydraulic control valve SLU that is supplied through the third switching valve 114, and the synchronous-meshing clutch S1 is engaged based on the output pressure Psl1 of the first hydraulic control valve SL1 that is supplied through the second switching valve 112, as shown in FIG. 6, thereby enabling the reverse driving using the gear transmission mechanism 28.

As described above, in the vehicle power transmission apparatus 10 of the present embodiment, in the event of detection of the predetermined anomaly with a possibility of the ON failure, the fail safe mode shown in FIG. 4 is established. Thus, not only in a case in which the lockup hydraulic control valve SLU actually works normally but also in a case in which the lockup hydraulic control valve SLU actually suffers from the ON failure, it is possible to perform the forward driving by the belt driving using belt continuously-variable transmission 24, and to appropriately perform the evacuation driving without the engine stall when the vehicle is stopped, with the lockup clutch LU being held in the released state.

Further, when the N range is selected in the event of the detection of the predetermined anomaly by which the fail safe mode is established, the ON-OFF solenoid valve SC1 is turned ON whereby the first switching valve 110 is placed in the second connection state, the ON-OFF solenoid valve SC3 is turned OFF whereby the third switching valve 114 placed in the first connection state, the lockup hydraulic control valve SLU is turned OFF and the second hydraulic control valve SL2 is tuned OFF, as shown in FIG. 3. In this instance, if the lockup hydraulic control valve SLU works normally, the output of the lockup hydraulic control valve SLU is stopped and accordingly the supply of the failure pressure Pfail to the failure switching valve 116 is stopped whereby the failure switching valve 116 is placed in the first connection state, as shown in FIG. 5. Thus, the lockup clutch LU is held in the released state, so that it is possible to prevent occurrence of the engine stall as a result of stop of rotation of the engine 12 due to engagement of the lockup clutch LU when the N range is switched to the R range or the D range. Further, with the failure switching valve 116 being placed in the first connection state, the supply of the hydraulic pressure from the failure switching valve 116 to the second hydraulic control valve SL2 is stopped, and accordingly the belt-driving clutch C2 is never engaged even if the second hydraulic control valve SL2 suffers from an ON failure in which the second hydraulic control valve SL2 is stuck in the hydraulic output state, so that it is possible to prevent the belt-driving clutch C2 from being engaged even in the neutral range due to the single failure of the second hydraulic control valve SL2, and to prevent discomfort from being given to the driver of the vehicle.

On the other hand, in a case in which the lockup hydraulic control valve SLU actually suffers from the ON failure, the failure switching valve 116 is placed in the second connection state based on the failure pressure Pfail by the output pressure Pslu of the lockup hydraulic control valve SLU, as shown in FIG. 7, thereby establishing a state substantially the same as the fail safe mode with the lockup hydraulic control valve SLU being turned ON, as is clear from FIGS. 3 and 4. That is, the lockup clutch LU is held in the released state, so that it is possible to prevent occurrence of the engine stall as a result of stop of rotation of the engine 12 due to engagement of the lockup clutch LU when the N range is switched to the R range or the D range. Further, with the output of the second hydraulic control valve SL2 being stopped, the belt-driving clutch C2 is released thereby establishing the neutral state in which the power transmission is cut off. In other words, the neutral state is established with the second hydraulic control valve SL2 being turned OFF in the fail safe mode.

Further, when the R range is selected in the event of the detection of the anomaly by which the fail safe mode is established, the first switching valve 110 is placed in the second connection state with the ON-OFF solenoid valve SC1 being turned ON, the second switching valve 112 is placed in the first connection state with the ON-OFF solenoid valve SC2 being turned OFF, the third switching valve 114 is placed in the second connection state with the ON-OFF solenoid valve SC3 being turned ON, the lockup hydraulic control valve SLU is turned ON, and the first hydraulic control valve SL1 is turned ON, as shown in FIG. 3. Thus, as shown in FIG. 6, the reverse-driving brake B1 is engaged and the synchronous-meshing clutch S1 is engaged, thereby enabling the reverse driving using the gear transmission mechanism 28. In that case, in the N range, the lockup clutch LU is held in the released state, irrespective of whether the lockup hydraulic control valve SLU actually suffers from the ON failure or not, so that it is possible to appropriately obtain the effect that is preventing occurrence of the engine stall as a result of stop of rotation of the engine 12 due to engagement of the lockup clutch LU when the N range is switched to the R range.

In the present embodiment, the N range and the R range shown in FIG. 3 are used in normal case as well as in the event of the detection of the potential ON failure of the lockup hydraulic control valve SLU. However, it is also possible to define the N range and the R range that are to be used in normal case, apart from those that are to be used in the event of the detection of the potential ON failure.

It is to be understood that the embodiment described above is given for illustrative purpose only, and that the present invention may be embodied with various modifications and improvements which may occur to those skilled in the art.

NOMENCLATURE OF ELEMENTS

10: vehicle power transmission apparatus
12: engine (drive power source)
14: torque converter (fluid transmission device)
16: automatic transmission
22: input shaft
24: belt continuously-variable transmission
28: gear transmission mechanism (gear power transmission device)
30: output shaft
70: hydraulic control unit
80: electronic control apparatus (control apparatus)
110: first switching valve
112: second switching valve
114: third switching valve
116: failure switching valve
LU: lockup clutch
TP1: first power transmission path
TP2: second power transmission path
C1: forward-driving clutch (gear-forward-driving frictional engagement device)
C2: belt-driving clutch (belt-driving frictional engagement device, forward-driving engagement device)
B1: reverse-driving brake (gear-reverse-driving frictional engagement device, reverse-driving engagement device)
S1: synchronous-meshing clutch (synchronous-meshing engagement device)
SLU: lockup hydraulic control valve
SL1: first hydraulic control valve
SL2: second hydraulic control valve
PL: line pressure
Pfail: failure pressure
Plimp: evacuation pressure
PD: D-range pressure
PR: R-range pressure
Pslu, Psl1, Psl2: control pressure

What is claimed is:

1. A power transmission apparatus for a vehicle, comprising:
   a fluid transmission device having a lockup clutch;
   an automatic transmission including: an input shaft to which a power is to be transmitted from a drive power source through the fluid transmission device; an output shaft; a hydraulically-operated forward-driving engagement device for forward driving of the vehicle; and a hydraulically-operated reverse-driving engagement device for reverse driving of the vehicle; and
   a hydraulic control unit including a first switching valve, a third switching valve and a failure switching valve that are provided for switching fluid paths, and a lockup hydraulic control valve and a second hydraulic control valve that are provided for controlling various hydraulic pressures, wherein the first switching valve is configured, when being placed in a first connection state thereof, to output a line pressure that is a source pressure for the various hydraulic pressures, as a D-range pressure for the forward driving of the vehicle, and is configured, when being placed in a second connection state thereof, to output a control pressure of the lockup hydraulic control valve, as a failure pressure to the failure switching valve, wherein the third switching valve is configured, when being placed in a first connection state thereof, to output the control pressure of the lockup hydraulic control valve to a lockup engagement passage for controlling an engagement pressure of the lockup clutch, and is configured, when being placed in a second connection state thereof, to output the control pressure of the lockup hydraulic control valve to the reverse-driving engagement device, wherein the failure switching valve is configured, when being placed in a first connection state thereof, to output the D-range pressure that is supplied with the first switching valve being placed in the first connection state thereof, to the second hydraulic control valve, and is configured, when being placed in a second connection state thereof, to output the line pressure that is supplied through a path separate from the D-range pressure, as an evacuation pressure for evacuation driving of the vehicle, to the second hydraulic control valve, and to output the failure pressure that is supplied with the first switching valve being placed in the second connection state thereof, to a lockup release passage for forcibly releasing the lockup clutch, wherein the failure switching valve is mechanically placed in the second connection state thereof when the failure pressure is supplied to the failure switching valve, and is mechanically placed in the first connection state thereof when the failure pressure is stopped to be supplied to the failure switching valve, wherein the second hydraulic control valve is disposed between the failure switching valve and the forward-driving engagement device, and is configured to control one of the D-range pressure and the evacuation pressure that are supplied from the failure switching valve, and to output a hydraulic output that is a controlled one of the D-range pressure and the evacuation pressure to the forward-driving engagement device for thereby controlling an operation state of the forward-driving engagement device, the power transmission apparatus comprising:

a control apparatus configured, in event of detection of a predetermined anomaly with a possibility of a failure in which the lockup hydraulic control valve is stuck in a hydraulic output state thereof, to establish a fail safe mode in which the first switching valve is placed in the second connection state thereof, the third switching valve is placed in the first connection state thereof, and the failure switching valve is placed in the second connection state based on the failure pressure that is a hydraulic output of the lockup hydraulic control valve, whereby the lockup clutch is held in a released state thereof based on the failure pressure supplied to the lockup release passage from the failure switching valve, and the forward-driving engagement device is engaged by a control pressure of the second hydraulic control valve, for thereby enabling the forward driving, wherein the control apparatus is configured, upon selection of a neutral range for cutting off transmission of the power in the event of the detection of the predetermined anomaly, to place the first switching valve in the second connection state thereof, place the third switching valve in the first connection state thereof, and stop the hydraulic output of the lockup hydraulic control valve and the hydraulic output of the second hydraulic control valve.

2. The power transmission apparatus according to claim 1, wherein the automatic transmission defines a first power transmission path and a second power transmission path that are disposed in parallel to each other between the input shaft and the output shaft, wherein the first power transmission path is provided by a gear power transmission device, a hydraulically-operated gear-forward-driving frictional engagement device, a hydraulically-operated gear-reverse-driving frictional engagement device and a hydraulically-operated synchronous-meshing engagement device that is disposed in series with the gear-forward-driving frictional engagement device and the gear-reverse-driving frictional engagement device, for enabling the forward driving and the reverse driving, wherein the second power transmission path is provided by a belt continuously-variable transmission and a hydraulically-operated belt-driving frictional engagement device, for enabling the forward driving of the vehicle, wherein the belt-driving frictional engagement device is the forward-driving engagement device while the gear-reverse-driving frictional engagement device is the reverse-driving engagement device, wherein the hydraulic control unit includes, in addition to the first switching valve, the third switching valve, the failure switching valve, the lockup hydraulic control valve and the second hydraulic control valve, a second switching valve that is provided for switching the fluid paths and a first hydraulic control valve that is provided for controlling the hydraulic pressures, wherein the first switching valve is configured, when being placed in the second connection state, to output the line pressure as an R-range pressure for the reverse driving of the vehicle, to the second switching valve, wherein the third switching valve is configured, when being placed in the first connection state, to output the D-range pressure that is supplied with the first switching valve being placed in the first connection state thereof, to the second switching valve, and to output the line pressure to the lockup hydraulic control valve, and is configured, when being placed in the second connection state, to output the R-range pressure that is supplied through the second switching valve with the first switching valve being placed in the second connection state thereof, to the lockup hydraulic control valve, wherein the second switching valve is configured, when being placed in a first connection state, to output the D-range pressure that is supplied with the first switching valve being placed in the first connection state thereof and with the third switching valve being placed in the first connection state thereof, to the failure switching valve, to output the line pressure to the first hydraulic control valve, to output a control pressure of the first hydraulic control valve to the synchronous-meshing engagement device, and to output the R-range pressure that is supplied with the first switching valve being placed in the second connection state thereof, to the third switching valve, and is configured, when being placed in a second connection state, to output the D-range pressure that is supplied with the first switching valve being placed in the first connection state thereof, to the failure switching valve, to output the D-range pressure that is supplied with the first switching valve being placed in the first connection state thereof and with the third switching valve being placed in the first connection state thereof, to the first hydraulic control valve, to output the control pressure of the first hydraulic control valve, to the failure switching valve, and to output the line pressure to the synchronous-meshing engagement device, wherein the failure switching valve is configured, when being placed in the first connection state, to output the D-range pressure that is supplied with the first switching valve being placed in the first connection state thereof and with the second switching valve being placed in the second connection state thereof, and supplied with the first switching valve being placed in the first connection state thereof, with the third switching valve being placed in the first connection state thereof and with the second switching valve being placed in the first connection state, to the second hydraulic control valve, and to output the control pressure of the first hydraulic control valve that is supplied with the first switching valve being placed in the first connection state thereof, with the third switching valve being placed in the first connection state thereof and with the second switching valve being placed in the second connection state, to the gear-forward-driving frictional engagement device, and wherein the control apparatus is configured, upon selection of a reverse range for the reverse driving of the vehicle in the event of the detection of the predetermined anomaly, to place the first switching valve in the second connection state thereof, place the second switching valve in the first connection state, place the third switching valve in the second connection state thereof, and to place the lockup hydraulic control valve and the first hydraulic control valve in hydraulic output states thereof.

* * * * *